United States Patent Office 3,338,785
Patented Aug. 29, 1967

3,338,785
CARBAMATE COMPOSITIONS AND METHODS OF USING
Charles D. Bossinger, Kankakee, and Kelly G. Taylor, Decatur, Ill., assignors to Armour Pharmaceutical Company, Chicago, Ill., a corporation of Delaware
No Drawing. Original application June 26, 1962, Ser. No. 205,198, now Patent No. 3,248,418, dated Apr. 26, 1966. Divided and this application Aug. 24, 1964, Ser. No. 391,763
12 Claims. (Cl. 167—65)

This invention relates to certain carbamate compounds and to a method of treating the central nervous system of animals, i.e., mammals and fowls, especially man and domestic animals, by administering these compounds to those animals. The novel compounds of this invention can be classified generally as hydroxy phenyl alkyl carbamate compounds, and more particularly as the class of such compounds containing tertiary alcohol groups.

This application is a divisional application from copending application Ser. No. 205,198, which is a continuation-in-part of copending application Ser. No. 729,554, filed Apr. 21, 1958, and of Ser. No. 38,763, filed June 27, 1960. Application Ser. No. 38,763 was a continuation-in-part of application Ser. No. 729,553, filed Apr. 21, 1958, and applications Ser. Nos. 729,553 and 729,554 were continuations-in-part of parent application Ser. No. 554,132, filed Dec. 20, 1955. Applications Ser. Nos. 554,132; 729,553 and 38,763 are now abandoned. Application Ser. No. 205,198 is now U.S. Patent No. 3,248,418.

It is an object of this invention to provide carbamate compounds for use in treating the central nervous system which achieve tranquilization with a minimum of muscle relaxation. Another related object is to provide carbamate compounds which can be used in treating anxiety states. Still another object is to provide carbamate compounds which combine the effects of tranquilization and mild sedation without cortical depressing effects. Further objects and advantages will be indicated in the following detailed specification.

The hydroxy phenyl alkyl carbamate compounds which are useful in the treatment of the central nervous system in accordance with the present invention all contain a tertiary alcohol group and are characterized by the following structural formula:

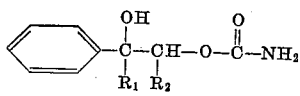

In the foregoing formula, $R_1$ is an alkyl group containing from 1 to 3 carbon atoms, and $R_2$ is either hydrogen or an alkyl group containing from 1 to 2 carbon atoms. In one preferred sub-class of compounds $R_1$ is ethyl and $R_2$ is hydrogen, or an alkyl group containing from 1 to 2 carbon atoms. Examples of such preferred compounds are 2-hydroxy-2-phenyl butyl carbamate, 3-hydroxy-3-phenyl pentyl-2-carbamate, and 4-hydroxy-4-phenyl hexyl-3-carbamate. Other compounds coming within the scope of the present invention are 2-hydroxy-2-phenyl propyl carbamate, and 2-hydroxy-2-phenyl pentyl carbamate.

The foregoing compounds can be prepared by the process described in copending application, Ser. No. 161,739, filed Dec. 22, 1961, now abandoned. In that process the first step is the preparation of an organic cyclic carbonate from which the desired carbamate compound can be obtained. The cyclic carbonate can be made by dissolving a phenyl ethane diol in a dialkyl carbonate and heating this reaction mixture to evaporate the hydroxy alkyl reaction by-product. This leaves the organic cyclic carbonate reaction product as the residue. If desired, an alkali catalyst man be used. The cyclic intermediate is a 4-phenyl ethylene carbonate, which is preferably reacted with ammonia to split the carbonate ring and form the desired carbamate. This procedure is described in greater detail in the cited application Ser. No. 161,739.

Other processes can be used to prepare the carbamates. In one such procedure, a 1,2-glycol is converted to the corresponding carbonate, and the carbonate is subjected to an ammonolysis to obtain the desired carbamate. This process was described in prior application Ser. No. 816,700, filed May 29, 1959, now U.S. Patent No. 3,066,164. Preferably, a 1,2-glycol is condensed with a halo-formic ester to obtain an acyclic carbonate which is then subjected to ammonolysis to obtain the monocarbamate. Since the particular process for preparing the carbamate compounds does not form a part of the present invention, it is not believed it will be necessary to further describe such processes herein, except that the preparation of specific carbamate compounds will be subsequently illustrated.

In utilizing the compounds of this invention for central nervous system treatment it is preferred to administer the compounds orally. Since the compounds are well-absorbed orally, it will usually not be necessary to resort to parenteral administration. For oral administration, it is preferred to combine the carbamate compound with a pharmaceutical carrier. The proportions of the carrier and carbamate compound are not critical, and they vary considerably depending whether the composition is to be filled into capsules or formed into tablets. In tableting, it will usually be desirable to employ at least as much of the pharmaceutical carrier as the carbamate compound. Various edible pharamaceutical carriers, or mixtures thereof can be used. For example, a mixture of lactose, dibasic calcium phosphate, and cornstarch is suitable. Additional ingredients can be included, such as lubricants like magnesium stearate.

When administering the compounds of this invention orally for central nervous system treatment, the total daily dose will usually fall within the range from 400 to 1600 milligrams of the carbamate compound per 24 hour period. Typically, the daily dose will range from 600 to 800 milligrams. In rare cases, it may sometimes be desirable to administer as much as 2,400 milligrams per day. In practicing the method of this invention, it will therefore be convenient to have the carbamate compound combined with a pharmaceutical carrier and prepared in tablets or other dosage unit form. Each tablet or dosage unit can contain from 50 to 600 milligrams of the carbamate compound. For example, tablets containing 200 milligrams of the carbamate compound can be administered either 1 tablet three times a day to achieve a daily dose of 600 milligrams or up to 2 tablets four times a day to achieve a daily dose of 1,600 milligrams.

The present invention is further illustrated by the following specific examples.

Example 1

The following method was used in preparing 2-hydroxy-2-phenyl butyl carbamate:

2-phenyl 1,2 butane diol in the amount of 16.6 gms. (0.1 mole) was mixed with 11.8 gm. (0.1 mole) of diethyl carbonate and 0.1 gm. of KOH in a round bottom flask equipped with a column for distillation. The reaction mixture was heated to 125° C. to allow take-off of the resulting ethanol as formed. This continued for approximately 4 hours or until ethanol removal ceased. Any excess ethyl carbonate was then removed under vacuum.

The residue 2-phenyl butylene carbonate was then treated with 100 ml. of concentrate $NH_4OH$ for 4 hours at room temperature. The ammonia is then removed at 40° C. under vacuum. The carbamate settled to the bottom and was drawn off as an oil. The aqueous layer was extracted with trichloroethylene and the oily carbonate added to this material. After drying these combined materials with sodium sulfate and azeotropic distillation to further dry the solvent, it was chilled to 0 to −5° C. The solid formed was collected on a Buchner and washed with cold trichloroethylene. There was obtained 16.3 gms. of 2-hydroxy-2-phenyl butyl carbamate. (78% over-all yield.)

*Example 2*

2.16 kg. (12 M) 3-phenyl 2,3-pentanediol
1.70 K (14.4) diethyl carbonate
21 gms. potassium hydroxide Using these materials the reaction was carried out in a manner similar to Example 1 to obtain the crude cyclic carbonate and this was in turn treated with 43 pounds of 28% aqueous ammonia to obtain 1.51 kg. (56%) of 3-hydroxy-3-phenyl-2-pentyl carbamate, M.P. 124.5–125.5° C.

*Example 3*

2-phenyl-1,2-propanediol, in the amount of 56 gms., was mixed with 150 mgs. of propylene carbonate in a round bottom flask equipped with a 25 mm. jacketed column. The resulting mixture was heated for a period of 14 hours at a bath temperature of 160–170° C. and a pressure of 35 mm. In this operation a distillate was obtained at a temperature of 90–134° C. Further distillation at a pressure of 35 mm. yielded 160 mgs. of reaction product. This reaction product was fractionated to yield 51.0 gms. of material having a boiling point of 126–128° C. at a pressure of 1.2 mm. The analysis of this reaction product was C 67.39 and H 5.66.

2-phenylpropylene carbonate, in the amount of 10.0 gms. was mixed with 200 ml. of a concentrated aqueous ammonium hydroxide solution. The resulting mixture was heated for a period of 1 hour on a steam bath. The excess ammonium and water were separated from the reaction product under reduced pressure. The separated reaction product, which was of the consistency of an oil, was fractionized by distillation. The resulting product, 2-hydroxy-2-phenyl propyl carbonate, which was obtained in a yield of 5.15 gms., had a boiling point of 160–167° C.

*Example 4*

2-phenyl-1,2-pentadiol, in the amount of 40.5 gms., was mixed with 125 ml. of propylene carbonate. The resulting mixture was incubated in an oil bath at a temperature of 165° C. and a pressure of 33–35 mm. of mercury for a period of 11 hours under total reflux.

The propylene glycol was then separated from the reaction mixture using a heated fractionating column equipped with a Todd take-off head. After 7 hours the propylene glycol ceased to be distilled, and then the excess propylene carbonate was removed from the reaction mixture. Thereafter, the pressure in the system was reduced to 0.65 mm. of mercury, and the residual mixture fractionated to yield a reaction product having a boiling point of 128–129° C. at a pressure of 0.65 mm. of mercury. The product was 2-phenyl-1,2-pentylene carbonate. 7.7 gms. (0.37 mole) of this product was mixed with 100 ml. of methyl alcohol. The mixture was saturated with ammonia and heated as previously described to yield 6.0 gms. (73%) of 2-hydroxy-2-phenyl-pentyl carbamate.

*Example 5*

3-phenyl-3,4-hexane diol 2900 g. and diethyl carbonate 2600 gm. were placed in a 12 liter flask. The reaction mixture was stirred and melted at 80° C. 50 gm. of powdered KOH was added. The temperature in the flask was raised to 126° C. After one to one and one-half hours at 126° C., the reaction started and a mixture of ethanol and diethyl carbonate was distilled rapidly at up to 94° C.

After the distillation was continued for four hours, all the volatile material was stripped off. The crude cyclic carbonate, 3100 gm., was mixed with four pounds of ammonia in thirteen liters of methanol at ice-bath temperature with stirring. The reaction mixture was then left standing at room temperature for 166 hours.

After all the volatile components were removed, the residual paste was dissolved in benzene at the ratio of 1 gm. per 6 ml. The mixture was filtered and the filtrate was permitted to crystallize at room temperature. The crystalline product, being 4-hydroxy-4-phenyl-3-hexyl carbamate, was collected and dried at 60° C. in a vacuum oven for 20 hours. The dried product weighed 2288 gm., a 70.5% yield, M.P. 116.5° C.

*Example 6*

Tablets for oral administration were prepared from 2-hydroxy-2-phenyl butyl carbamate. This compound was combined with a mixed pharmaceutical carrier in the ratio of 2 parts by weight of the carbamate compound per 3 parts of the pharmaceutical carrier. The mixed carrier contained dibasic calcium phosphate as the principal ingredient together with smaller amounts of lactose and 1 part of cornstarch. A small amount of magnesium stearate was also included.

The carbamate compound, the calcium phosphate, the lactose, and part of the magnesium stearate were blended and dry mixed until a uniform composition was obtained. This was formed into firm slugs no greater than ¼ inch thick. The slugs were then put through an oscillating granulator equipped with a 10 mesh screen. The cornstarch and a little more magnesium stearate was added at intervals while the slugs were being sized. The granulation was blended in a drum tumbler for 30 minutes. Following this, the granulation was compressed into tablets of 500 mg. per tablet containing 200 milligrams of the carbamate compound.

While in the foregoing specification, this invention has been described in relation to certain preferred embodiments, and many details have been set forth for purpose of illustration, it will be apparent to those skilled in the art that the invention is susceptible to additional embodiments, and that certain of the details set forth herein can be varied considerably without departing from the basic principles of the invention.

We claim:

1. A composition in dosage unit form for inducing tranquilization and mild sedation in an animal to whom it is administered comprising about 50 to 600 milligrams of a hydroxy phenyl alkyl carbamate compound in admixture with a pharmaceutical carrier, said compound containing a tertiary alcohol group and having the structural formula

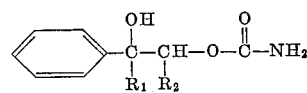

wherein $R_1$ is an alkyl containing from 1 to 3 carbon atoms and $R_2$ is selected from the class consisting of hydrogen and an alkyl containing from 1 to 2 carbon atoms.

2. The composition of claim 1 wherein said compound is 2-hydroxy-2-phenyl butyl carbamate.

3. The composition of claim 1 wherein said compound is 3-hydroxy-3-phenyl pentyl-2-carbamate.

4. The composition of claim 1 wherein said compound is 4-hydroxy-4-phenyl hexyl-3-carbamate.

5. The method of inducing tranquilization and mild sedation in animals, including man, comprising orally administering to said animals up to 2400 milligrams of a hydroxy phenyl alkyl carbamate compound containing a tertiary alcohol group and having the structural formula

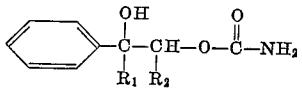

wherein $R_1$ is an alkyl containing from 1 to 3 carbon atoms and $R_2$ is selected from the class consisting of hydrogen and an alkyl containing from 1 to 2 carbon atoms.

6. The method of claim 5 wherein said compound is 2-hydroxy-2-phenyl butyl carbamate.

7. The method of claim 5 wherein said compound is 3-hydroxy-3-phenyl pentyl-2-carbamate.

8. The method of claim 5 wherein said compound is 4-hydroxy-4-phenyl hexyl-3-carbamate.

9. The method of inducing tranquilization and mild sedation in animals, including man, comprising orally administering to said animals from 400 to 1600 milligrams per 24 hour period of a hydroxy phenyl alkyl carbamate compound containing a tertiary alcohol group and having the structural formula

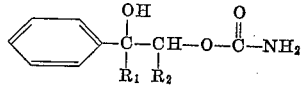

wherein $R_1$ is an alkyl containing from 1 to 3 carbon atoms and $R_2$ is selected from the class consisting of hydrogen and an alkyl containing from 1 to 2 carbon atoms.

10. The method of claim 9 wherein said compound is 2-hydroxy-2-phenyl butyl carbamate.

11. The method of claim 9 wherein said compound is 3-hydroxy-3-phenyl pentyl-2-carbamate.

12. The method of claim 9 wherein said compound is 4-hydroxy-4-phenyl hexyl-3-carbamate.

References Cited

UNITED STATES PATENTS

| 2,627,524 | 2/1953 | Malkemus | 260—482 |
| 2,967,880 | 1/1961 | Finke | 260—482 |
| 3,144,389 | 8/1964 | Bossinger | 260—482 |

SAM ROSEN, *Primary Examiner.*